(12) United States Patent
Jones et al.

(10) Patent No.: US 12,504,478 B2
(45) Date of Patent: Dec. 23, 2025

(54) APPARATUS AND METHOD FOR BATTERY SOC ESTIMATION

(71) Applicant: Gotion, Inc., Fremont, CA (US)

(72) Inventors: Trevor Jones, Fremont, CA (US); Xiaojun Li, Fremont, CA (US); David Jauernig, Fremont, CA (US); Jianwei Li, Fremont, CA (US)

(73) Assignee: Gotion, Inc., Fremont, CA (US)

( * ) Notice: Subject to any disclaimer, the term of this patent is extended or adjusted under 35 U.S.C. 154(b) by 124 days.

(21) Appl. No.: 17/750,654

(22) Filed: May 23, 2022

(65) Prior Publication Data

US 2023/0375626 A1 Nov. 23, 2023

(51) Int. Cl.
*G01R 31/3832* (2019.01)
*G01R 31/367* (2019.01)
*G06N 3/045* (2023.01)

(52) U.S. Cl.
CPC ....... *G01R 31/3833* (2019.01); *G01R 31/367* (2019.01); *G06N 3/045* (2023.01)

(58) Field of Classification Search
None
See application file for complete search history.

(56) References Cited

U.S. PATENT DOCUMENTS

| | | | |
|---|---|---|---|
| 10,838,010 B2* | 11/2020 | Heiries | G01R 31/367 |
| 2019/0170827 A1* | 6/2019 | Shoa Hassani Lashidani | |
| | | | G01R 31/392 |
| 2020/0081070 A1* | 3/2020 | Chemali | H01M 10/486 |
| 2021/0123975 A1* | 4/2021 | Sarwat | G01R 31/3648 |
| 2022/0271549 A1* | 8/2022 | Chemali | G06N 3/084 |
| 2023/0122362 A1* | 4/2023 | Shoa Hassani Lashidani | |
| | | | G01R 31/392 |
| | | | 702/63 |
| 2023/0358810 A1* | 11/2023 | Rayappan | H02J 7/00 |

OTHER PUBLICATIONS

Zhao, Bo, et al. "Estimation of the SOC of energy-storage lithium batteries based on the voltage increment." Ieee Access 8 (2020): 198706-198713. (Year: 2020).*

(Continued)

*Primary Examiner* — Raymond L Nimox
(74) *Attorney, Agent, or Firm* — Nutter McClennen & Fish LLP

(57) ABSTRACT

An apparatus for battery state of charge (SOC) estimation, including: a pre-processing unit (200), configured for detecting operating parameters of a batters, and filtering at least part of the parameters to generate filtered parameters; an SOC estimating unit (300), configured for calculating nominal SOC by using a first neural network based on the operating parameters and the filtered parameters; a validity estimating unit (400), configured for estimating a validity value based on the operating parameters and the filtered parameters, the validity value indicating validity of the nominal SOC outputted by the SOC estimating unit (300); an SOC Kalman filter (500), configured for performing a Kalman filtering algorithm based on the operating parameters, the nominal SOC transmitted and the validity value, thereby outputting an estimated SOC of the battery.

13 Claims, 7 Drawing Sheets

(56) References Cited

OTHER PUBLICATIONS

Pawar, G. Ranjith, L. S. Praveen, and S. N. Nagananda. "Implementation of Lithium-Ion Battery Management System with an Efficient SOC Estimation Algorithm." 2020 International Conference on Recent Trends on Electronics, Information, Communication & Technology (RTEICT). IEEE, 2020. (Year: 2020).*

Arsri, Sifaus Wulaning, Oyas Wahyunggoro, and Adha Imam Cahyadi. "A review of adaptive filter algorithm-based battery state of charge estimation." 2021 International Seminar on Machine Learning, Optimization, and Data Science (ISMODE). IEEE, 2022. (Year: 2022).*

* cited by examiner

APPARATUS AND METHOD FOR BATTERY SOC ESTIMATION

TECHNICAL FIELD

Embodiments of the present disclosure generally relate to the field of battery, and more particularly, to an apparatus and method for battery state of charge (SOC) estimation.

BACKGROUND

This section introduces aspects that may facilitate better understanding of the present disclosure. Accordingly, the statements of this section are to be read in this light and are not to be understood as admissions about what is in the prior art or what is not in the prior art.

Secondary (rechargeable) batteries are used in personal portable electronics, electric vehicles, and power system energy storage applications. Battery SOC, defined as the percentage of remaining capacity relative to the maximum capacity of the battery, is an important value that must be calculated by the battery management system (BMS). The BMS uses SOC to provide an indication of when a battery needs to be recharged; to prolong battery life by preventing operation leading to over-charge or over-discharge; and, in electric vehicle applications, to provide an indication of driving range. Battery SOC cannot be measured directly, so it must be estimated using available measurements.

One prevalent battery SOC estimation method is coulomb counting with open-circuit voltage (OCV) and charge-end correction. In this methodology, the BMS calculates the SOC based on the net charge extracted from the battery during operation by integrating the current withdrawn from the battery (i.e. counting the coulombs extracted). When the battery voltage reaches equilibrium after a sufficiently long resting period, the equilibrium voltage (OCV) can be used to correct the SOC based on the OCV-to-SOC relation. Alternatively, SOC can be corrected by setting the value to 100% at charge end, which occurs when the battery voltage reaches a rated value at the end of a well-defined charging sequence. A benefit of this method is its relative simplicity.

A substantial body of research has been devoted to development of battery SOC estimation methods based on the Kalman filter algorithm and used in conjunction with an equivalent circuit model (ECM) of the battery. Researchers have reported methods based on extended Kalman filter (EKF), unscented Kalman filter (UKF), and sigma-point Kalman filter (SPKF), collectively referred to here as "xKF". As a rule, these methods are accurate to the extent that the ECM and the corresponding xKF covariance parameters are accurate.

Researchers have also reported battery SOC estimation methods using xKF approaches in conjunction with a neural network SOC model. Neural network SOC models can be developed efficiently and reliably using commercially available neural-network optimization packages.

SUMMARY

Inventor of this disclosure found that each of the existing battery SOC estimation methods had some limitation.

As for the coulomb counting method, it is known to be inaccurate under certain conditions. If the initial SOC estimate is incorrect, the SOC estimation error will persist until conditions are met for proper OCV or charge-end SOC correction. Furthermore, prolonged integration of the current without SOC correction can lead to SOC inaccuracy due to accumulation of current measurement errors.

As for the method based on xKF used in conjunction with an ECM, a substantial amount of engineering resources may be required to meet accuracy targets. First, the required ECM prediction accuracy may be obtained by scheduling ECM parameters based on operating zone, which may be defined using detected physical quantities such as temperature and current and using calculated values such as SOC. Second, in cases where ECM prediction accuracy is known to vary with operating zone, the xKF covariance parameters may be scheduled according to operating zone. The process of constructing such parameter schedules in many cases requires a substantial amount of engineering development resources.

As for the method of using xKF approaches in conjunction with a neural network SOC model, since the model prediction accuracy may vary with operating zone (for example, it may be inaccurate in "flat" voltage zones where SOC is not well correlated with available measurements), the xKF covariance parameters may be scheduled according to operating zone in order to meet accuracy targets. The development of such parameter schedules may involve substantial engineering resources.

In general, embodiments of the present disclosure provide an apparatus for battery SOC estimation, a method for battery SOC estimation, and a method for computing parameters used for battery SOC estimation. The present disclosure aims at estimating battery SOC accurately using a systematic and efficient development methodology.

In a first aspect, there is provided an apparatus for battery state of charge (SOC) estimation, including:
   a pre-processing unit (200), configured for detecting operating parameters of a battery, and filtering at least part of the parameters to generate filtered parameters;
   an SOC estimating unit (300), configured for calculating nominal SOC by using a first neural network based on the operating parameters and the filtered parameters transmitted 24 thereto from the pre-processing unit;
   a validity estimating unit (400), configured for estimating a validity value based on the operating parameters and the filtered parameters transmitted thereto from the pre-processing unit, the validity value indicating validity of the nominal SOC outputted by the SOC estimating unit (300);
   an SOC Kalman filter (500), configured for performing a Kalman filtering algorithm based on the operating parameters transmitted thereto from the pre-processing unit, the nominal SOC transmitted thereto from the SOC estimating unit and the validity value transmitted thereto from the validity estimating unit, thereby outputting an estimated SOC of the battery.

In a second aspect, there is provided a method for battery state of charge (SOC) estimation, including:
   detecting operating parameters of a battery, and filtering at least part of the parameters to generate filtered parameters;
   calculating nominal SOC by using a first neural network based on the operating parameters and the filtered parameters;
   calculating a validity value based on the operating parameters and the filtered parameters, the validity value indicating validity of the nominal SOC;
   perforating a Kalman filtering algorithm based on the operating parameters, the nominal SOC and the validity value, thereby outputting an estimated SOC of the battery.

In a third aspect, there is provided a method for computing parameters used for battery state of charge (SOC) estimation, including:
  computing a nominal SOC based on experimental data;
  computing a squared nominal SOC error based on the experimental data;
  identifying a subset of data from data set for which the squared nominal SOC error is less than a first predetermined value; and
  calculating the variance of the difference between true SOC and nominal SOC for the identified subset of data, wherein the calculating result is parameter R used in the Kalman filtering algorithm.

According to various embodiments of the present disclosure, a first neural network is used to estimate the nominal SOC, a validity value of the nominal SOC is calculated and an SOC Kalman filter calculates an estimated SOC based on the nominal SOC and the validity value. Therefore, a systematic and efficient development methodology may be used to accurately estimate battery SOC.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

First Aspect of Embodiments

An apparatus for battery state of charge (SOC) estimation is provided in a first aspect of embodiments.

Figure 1:
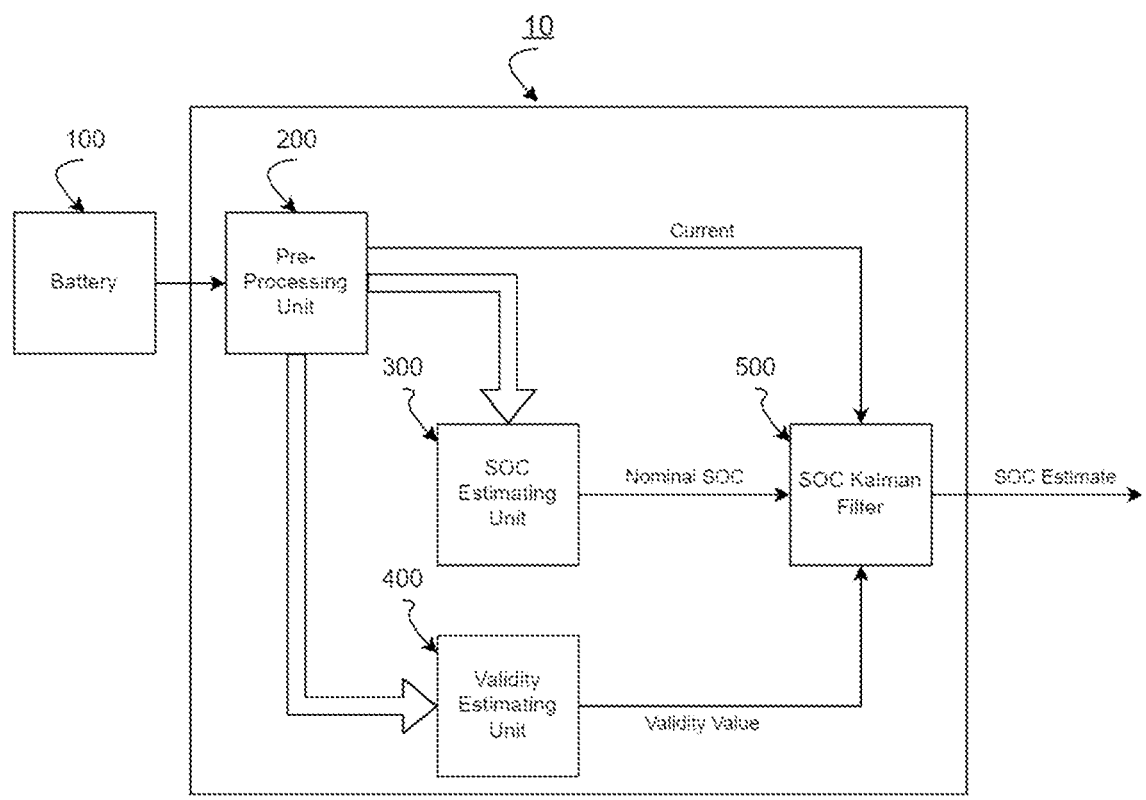
FIG. 1 is a block diagram schematically illustrating an apparatus for estimating SOC of a battery according to a preferred embodiment of the present disclosure.

FIG. 1 is a block diagram schematically illustrating an apparatus 10 for estimating battery SOC according to one embodiment of the present disclosure. As shown in FIG. 1, the apparatus 10 includes a pre-processing unit 200, an SOC estimating unit 300, a validity estimating unit 400 and an SOC Kalman filter 500.

In at least one embodiment, the pre-processing unit 200 is configured for detecting operating parameters of a battery 100 (as shown in FIG. 1), and filtering at least part of the parameters to generate filtered parameters. For example, the operating parameters detected by the pre-processing unit 200 include current, voltage and temperature; the filtered parameters include filtered current and filtered voltage. However, the embodiment is not limited there to, the operating parameters and filtered parameters may be of other kind.

The SOC estimating unit 300 is configured for calculating nominal SOC by using a first neural network based on the operating parameters and the filtered parameters transmitted thereto from the pre-processing unit 200.

The validity estimating unit 400 is configured for estimating a validity value based on the operating parameters and the filtered parameters transmitted thereto from the pre-processing unit 200. The validity value indicates validity of the nominal SOC outputted by the SOC estimating unit 300.

The SOC Kalman filter 500 is configured for performing a Kalman filtering algorithm based on the operating parameters (for example, the current) transmitted thereto from the pre-processing unit 200, the nominal SOC transmitted thereto from the SOC estimating unit 300 and the validity value transmitted thereto from the validity estimating unit 400, thereby outputting an estimated SOC of the battery 100.

According to the first aspect of disclosure, the first neural network is used to estimate the nominal SOC, validity value of the nominal SOC is calculated and the SOC Kalman filter calculates the estimated SOC based on the nominal SOC and the validity value. Therefore, a systematic and efficient development methodology may be used to accurately estimate battery SOC.

Figure 2:
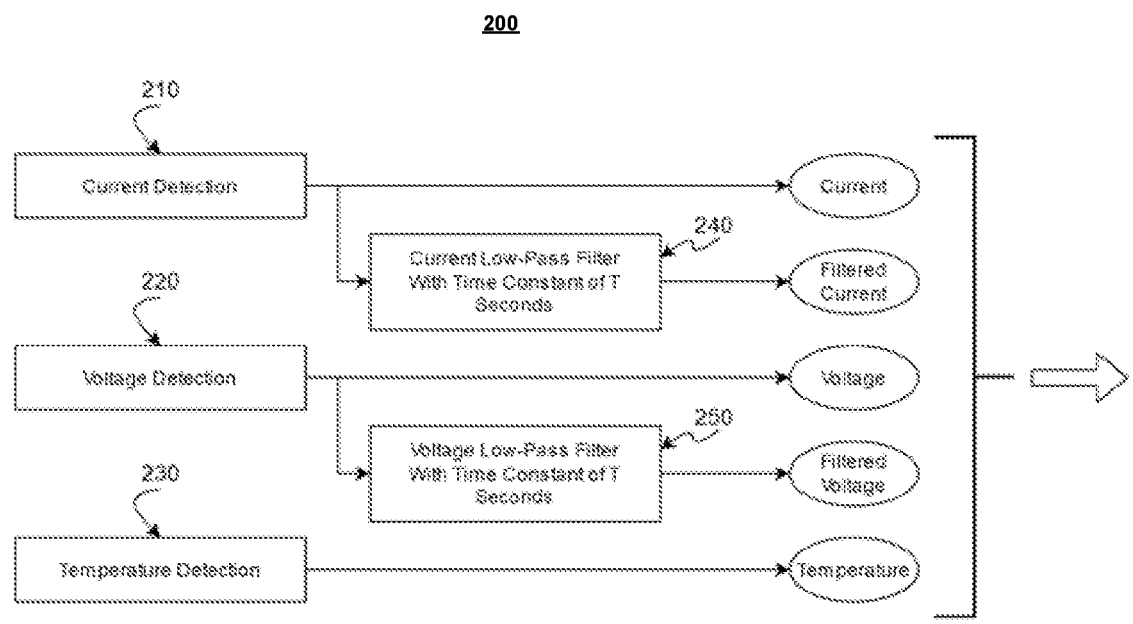
FIG. 2 is a diagram schematically illustrating a pre-processing unit according to a preferred embodiment of the present disclosure.

FIG. 2 is a diagram schematically illustrating the pre-processing unit 200 according to one embodiment of the present disclosure. As shown in FIG. 2, the pre-processing unit 200 includes a current detection unit 210, a voltage detection unit 220, a temperature detection unit 230, a current low-pass filter 240 and a voltage low-pass filter 250.

In at least one embodiment, method for detecting the current, voltage and temperature of the battery 100 may be referred to the related art.

The current low-pass filter 240 may filter the current by using time constant of T seconds thereby outputting the filtered current. The voltage low-pass filter 250 may filter the voltage by using time constant of T seconds thereby outputting the filtered voltage.

In a preferred embodiment, the current low-pass filter 240 and voltage low-pass filter 250 may be implemented according to the following discretized filter calculation $$x_{k+1} = e^{\frac{-T_s}{T}} x_k + \left(1 - e^{\frac{-T_s}{T}}\right) u_k \quad \text{(Equation 1)}$$

Where, calculation cycle time of the current low-pass filter 240 and/or the voltage low-pass filter 250 is $T_s$ seconds, calculation cycle is k, input signal is $u_k$, filtered signal is $x_k$, and filtered signal for the next calculation cycle is $x_{k+1}$. As for the current low-pass filter 240, input signal $u_k$ is current, and filtered signal $x_k$ is filtered current. As for the voltage low-pass filter 250, input signal $u_k$ is voltage, and filtered signal $x_k$ is filtered voltage.

Figure 3:
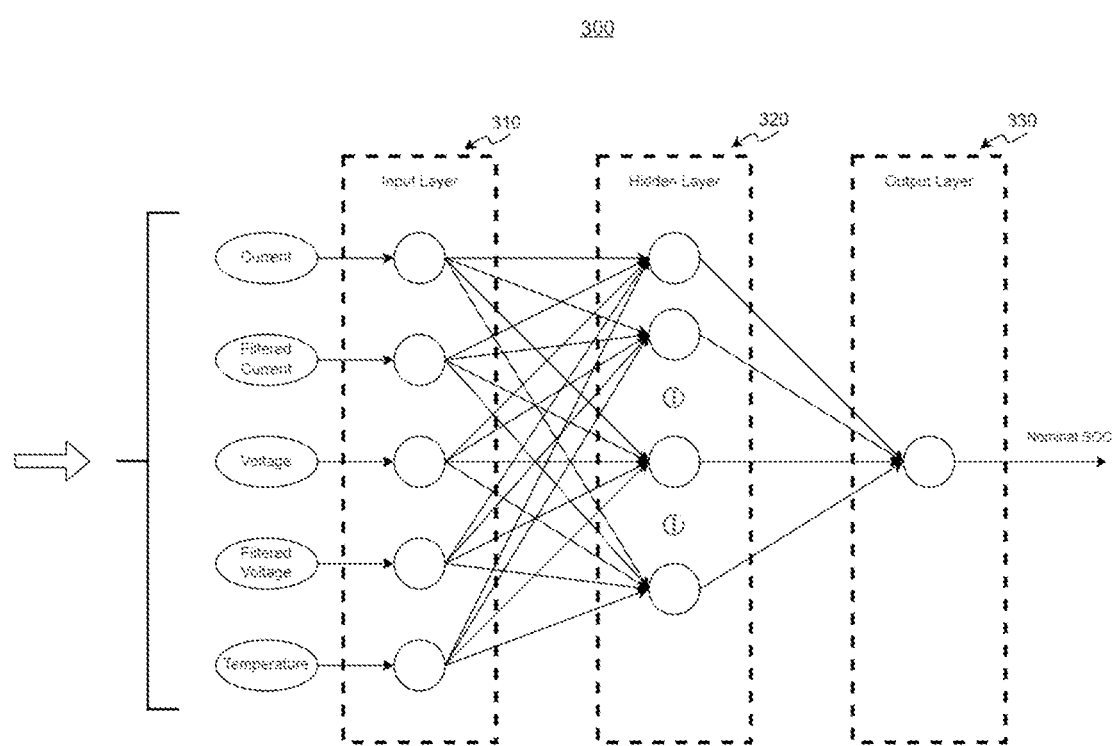
FIG. 3 is a diagram schematically illustrating an SOC estimating unit according to a preferred embodiment of the present disclosure.

FIG. 3 is a diagram schematically illustrating the SOC estimating unit 300 according to one embodiment of the present disclosure. The first neural network (namely SOC neural network) is used in the SOC estimating unit 300. As shown in FIG. 3, 310 is an input layer for the SOC neural network, for example, the current, the voltage, the temperature, the filtered current and the filtered voltage are input to the input layer 310, 320 is a hidden layer for the SOC neural network. 330 is an output layer for the SOC neural network. The working principle of the SOC neural network may be referred to the related art.

Figure 4:
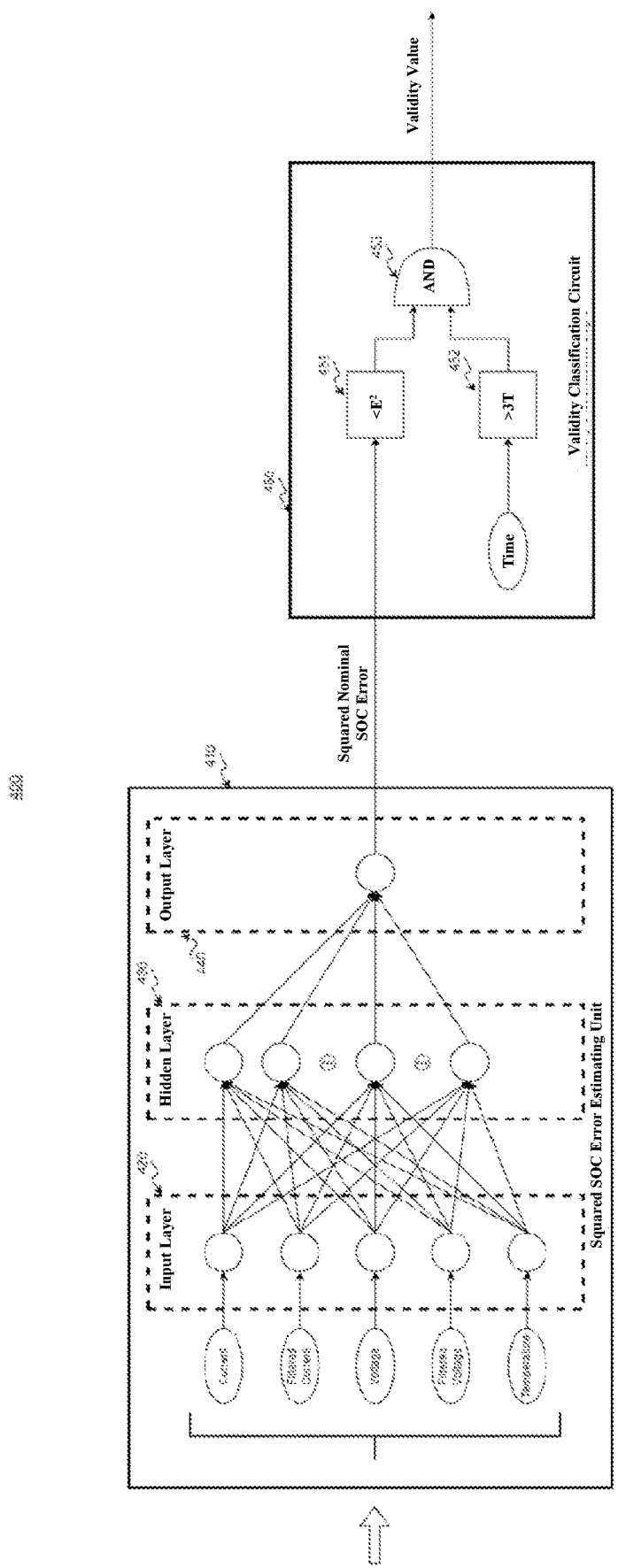
FIG. 4 is a diagram schematically illustrating a validity estimating unit according to a preferred embodiment of the present disclosure.

FIG. 4 is a diagram schematically illustrating a validity estimating unit 400 according to one embodiment of the present disclosure. As shown in FIG. 4, the validity estimating unit 400 includes a squared SOC error estimating unit 410 and a validity classification circuit 450.

The squared SOC error estimating unit 410 may estimate squared nominal SOC error by using a second neural network (namely squared SOC error neural network) based on the operating parameters and the filtered parameters. The squared nominal SOC error indicates square of the difference between true SOC and the nominal SOC.

As shown in FIG. 4, 420 is an input layer for the second neural network (namely squared SOC error neural network), for example, the current, the voltage, the temperature, the filtered current and the filtered voltage are input to the input layer 420, 430 is a hidden layer for the squared SOC error neural network. 440 is an output layer for the squared SOC error neural network, for example, the squared nominal SOC error is outputted from the output layer 440. The working principle of the squared SOC error neural network may be referred to the related art.

As shown in FIG. 4, the validity classification circuit 450 may output the validity value based on magnitude of the squared nominal SOC error being below a first predetermined value and an elapsed execution time since the current low-pass filter initialization and/or the voltage low-pass filter initialization being greater than a second predetermined value. For example, the first predetermined value is $E^2$. In a preferred embodiment, the parameter E is 1%. The second predetermined value may be 3T, where T is the time constant of the current low-pass filter 240 and the voltage low-pass filter 250.

For example, the nominal SOC validity is set to 1 (valid) if the squared nominal SOC error is less than $E^2$ and the elapsed execution time since the current low-pass filter initialization and/or the voltage low-pass filter initialization is greater than 3T. Otherwise, the nominal SOC validity is set to 0 (invalid).

As shown in FIG. 4, in a preferred embodiment, the validity classification circuit 450 includes a first judgment unit 451, a second judgment unit 452 and a logic unit 453. The first judgment unit 451 may determine whether the squared nominal SOC error is below the first predetermined value, for example, the first judgment unit 451 may output 1 if the squared nominal SOC error is below the first predetermined value. The second judgment unit 452 may determine whether elapsed execution time since the current low-pass filter initialization and/or the voltage low-pass filter initialization is greater than the second predetermined value, for example, the second judgment unit 452 may output 1 if the elapsed execution time since the current low-pass filter initialization and/or the voltage low-pass filter initialization is greater than the second predetermined value. The logic unit 453 may output the validity value according to determination result of the first judgment unit 451 and determination result of the second judgment unit 452, for example, the logic unit 453 is an AND gate, which may output 1 if the first judgment unit 451 and the second judgment unit 452 both output 1. However, the embodiment is not limited there to, the validity classification circuit 450 may have other structure.

Figure 5:
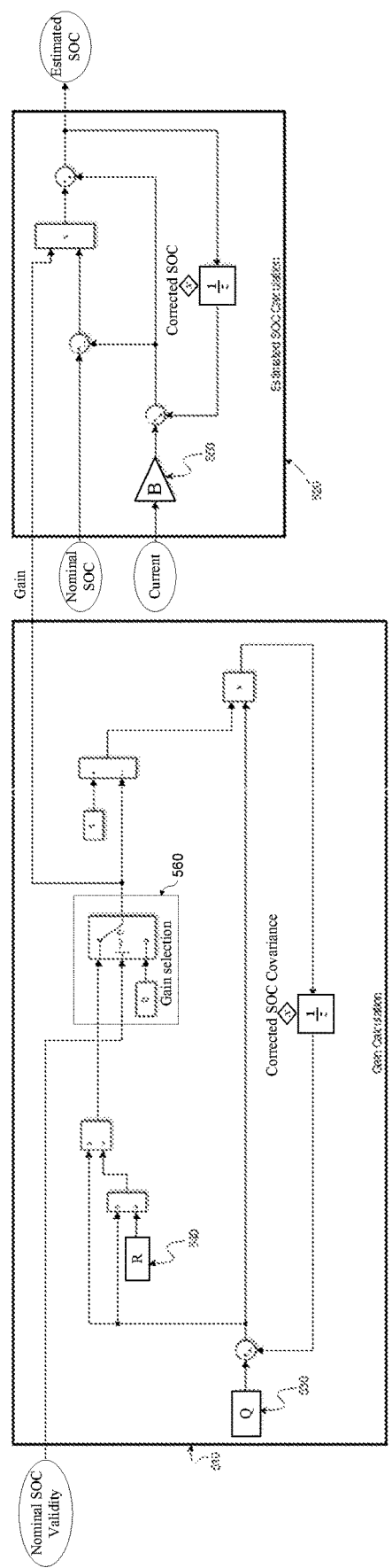
FIG. 5 is a diagram schematically illustrating an SOC Kalman filter according to a preferred embodiment of the present disclosure.

FIG. 5 is a diagram schematically illustrating an SOC Kalman filter 500 according to one embodiment of the present disclosure. The SOC Kalman filter 500 includes a gain calculator 510 and an estimated SOC calculator 520.

The gain calculator 510 may apply gain selection unit 560 to calculate the gain value based on the validity value, parameter Q (530) and parameter R (540).

In a preferred embodiment of gain selection unit 560, if the validity value indicates the nominal SOC is valid (for example, the validity value is 1), the gain value is calculated according to the Kalman filter formulation:

$$L_k = \frac{\Sigma_{z,k}^-}{\Sigma_{z,k}^- + R} \quad \text{(Equation 2)}$$

where gain is $L_k$, predicted SOC covariance is $\Sigma_{z,k}^-$, and parameter R (540) is R.

In a preferred embodiment of gain selection unit 560, if the validity value indicates the nominal SOC is invalid (for example, the validity value is 0), then gain is set to 0. Mathematically, this is equivalent to setting the covariance associated with an error between the nominal SOC and a true SOC to infinity when the nominal SOC is invalid.

The parameter Q (530) is covariance associated with a rate of increase in the SOC covariance if SOC is not otherwise corrected. The parameter Q can be estimated based on the combination of such factors as the current sensor accuracy, Coulombic efficiency uncertainty, SOC Kalman filter calculation cycle time uncertainty and cell capacity uncertainty.

The parameter R (540) is the covariance associated with an error between the nominal SOC and a true SOC when the validity value indicates the nominal SOC is valid (for example, the validity value is 1).

The estimated SOC calculator 520 may calculate the estimated SOC based on the nominal SOC, the current, the parameter B (550) and the gain value.

Parameter B is the predicted change in SOC, over the time period from the previous calculation cycle of the SOC Kalman filter to the present calculation cycle of the SOC Kalman filter, for one Ampere of current. Parameter B may be determined according to the SOC Kalman filter calculation cycle time (Ts) and rated capacity (C) of the battery 100. In a preferred embodiment, the parameter B (550) is calculated according to the following formula:

$$B = 100 \frac{T_s}{C} \qquad \text{(Equation 3)}$$

In FIG. 1, parameters used in the apparatus 10 may be preset, so that the apparatus 10 may use the parameters directly. The parameters may include weights of the first neural network, weights of the second neural network and the parameter R etc. The parameters may be calculated by a calculator which is independent from the apparatus 10.

Figure 6:
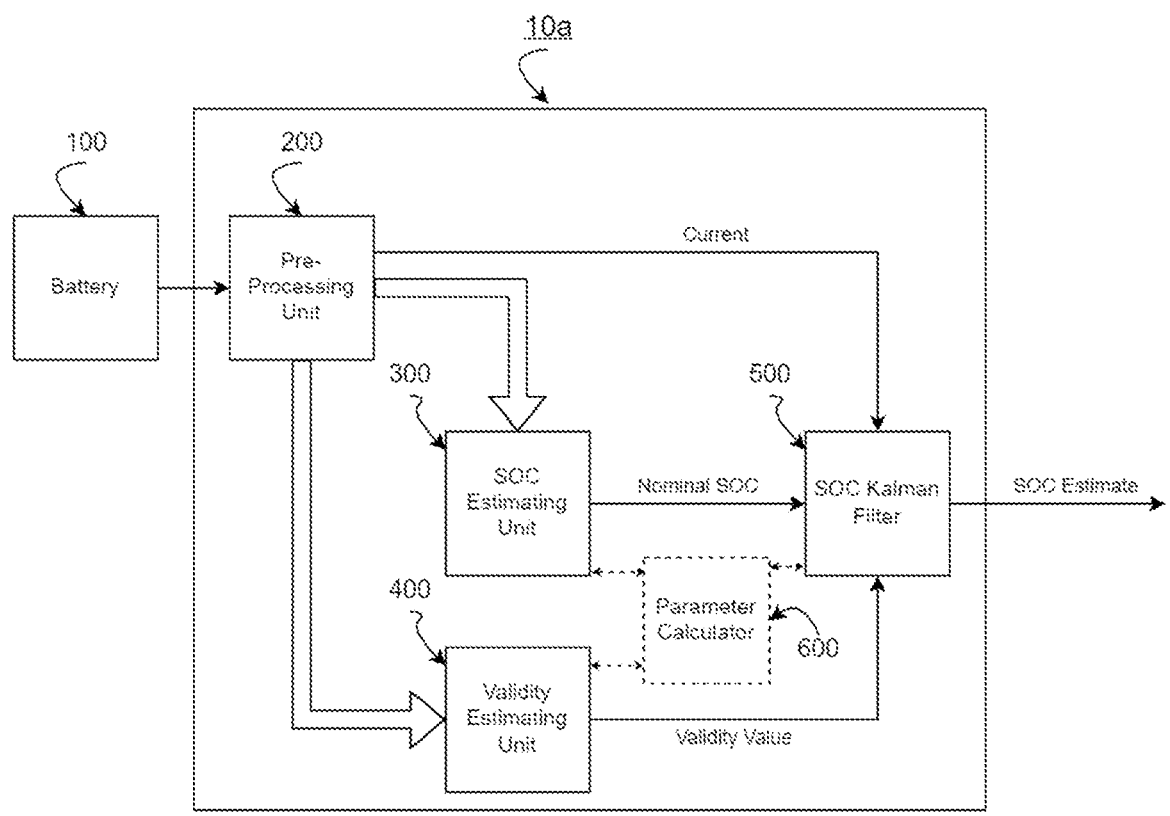
FIG. 6 is a block diagram schematically illustrating an apparatus for estimating SOC of a battery according to another embodiment of the present disclosure.

As shown in FIG. 6, in at least another embodiment, an apparatus 10a may include a pre-processing unit 200, an SOC estimating unit 300, a validity estimating unit 400 and an SOC Kalman filter 500. The apparatus 10a further includes a parameter calculator 600, which may calculate parameters used in the apparatus 10a. The parameters may include weights of the first neural network, weights of the second neural network and the parameter R etc. The same parts of apparatus 10a and apparatus 10 will not be described, but the parameter calculator 600 will be described below.

Figure 7:
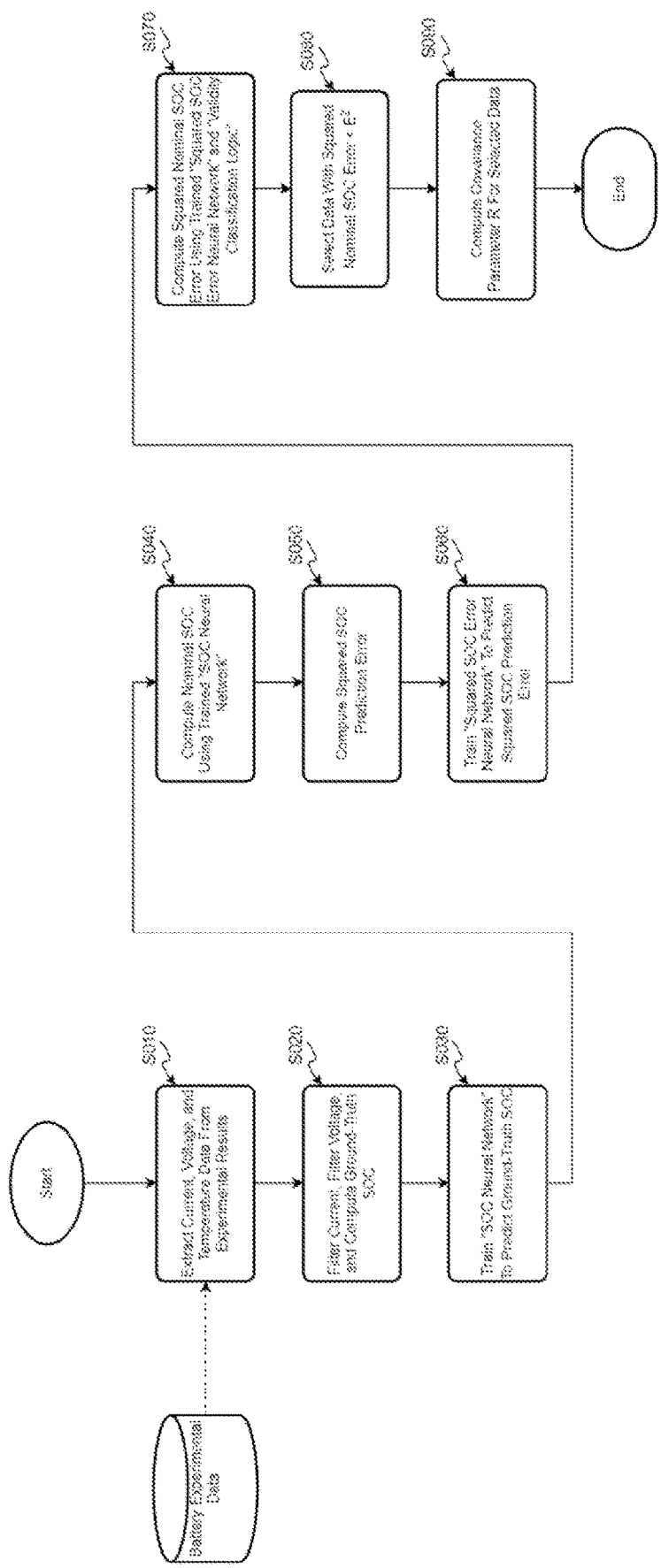
FIG. 7 is a flowchart sequentially illustrating steps for computing the parameters used for SOC estimation according to a preferred embodiment of the present disclosure.

FIG. 7 is a flowchart sequentially illustrating blocks for computing the parameters used for SOC estimation by parameter calculator 600 according to one embodiment of the present disclosure.

In block S010, the current, voltage, and temperature data are extracted from experimental results (i.e. experimental data) from battery tests that are designed to be representative of the operating conditions of the battery application.

In block S020, the current is filtered using a low-pass filter in a manner that is consistent with the operation of the current low-pass filter 240, the voltage is filtered in a manner consistent with the operation of the voltage low-pass filter 250, and the true SOC is calculated using coulomb counting. For example, the parameter calculator 600 may control the pre-processing unit (200) to filter the current and the voltage, or the parameter calculator 600 may filter the current and the voltage by itself.

In block S030, the first neural network is trained. For example, the SOC neural network (the first neural network) weights are optimized using a training algorithm such as the Levenberg-Marquardt algorithm, with the objective of minimizing the RMS error between the true SOC values computed in block S020 and the nominal SOC values computed by the SOC neural network (the first neural network) under training when evaluated at the corresponding current, voltage, temperature, filtered current, and filtered voltage values gathered in blocks S010 and S020.

In block S040, the nominal SOC values are computed by evaluating the trained SOC neural network at the current, voltage, temperature, filtered current, and filtered voltage values gathered in blocks S010 and S020. For example, the parameter calculator 600 controls the SOC estimating unit 300 to compute the nominal SOC by using the trained SOC neural network (first neural network).

In block S050, the squared SOC prediction error is computed as the square of the difference between the true SOC values and the corresponding nominal SOC values.

In block S060, the second neural network is trained. For example, the squared SOC error neural network (second neural network) weights are optimized using a training algorithm such as the Levenberg-Marquardt algorithm, with the objective of minimizing the RMS error between the squared SOC prediction error computed in block S050 and the squared nominal SOC error values computed by the squared SOC error neural network (second neural network) under training when evaluated at the corresponding current, voltage, temperature, filtered current, and filtered voltage values gathered in blocks S010 and S020.

In block S070, the squared nominal SOC error values are computed by evaluating the trained squared SOC error neural network at the current, voltage, temperature, filtered current, and filtered voltage values gathered in blocks S010 and S020. For example, the parameter calculator 600 controls the validity estimating unit 400 to compute the squared nominal SOC error by using the trained squared SOC error neural network (second neural network).

In block S080, a subset of the original data set is identified for which the squared nominal SOC error values are less than $E^2$. In one exemplary embodiment, parameter E was chosen to be 1%.

In block S090, the parameter R is calculated as the variance of the difference between the true SOC values and corresponding nominal SOC values, for the data subset identified in block S080 The parameter R is used in the Kalman filtering algorithm.

In FIG. 7, the blocks of S010, S020 and S030 refer to a process of calculating weights of the first neural network; the blocks of S040, S050 and S060 refer to a process of calculating weights of the second neural network; the blocks S070, S080 and S090 refer to a process of calculating the parameter R.

In at least one embodiment, the method shown in FIG. 7 may be implemented to computing the parameters, and the parameters are used in a method for estimating battery SOC carried out by the apparatus 10 or 10a.

In at least another embodiment, the method shown in FIG. 7 and the method for estimating battery SOC carried out by the apparatus 10 or 10a may be implemented independently. For example, the method shown in FIG. 7 is provided to calculate the parameters, and the parameters are used in a method which is different from the one implemented by the apparatus 10 or 10a to estimate battery SOC. For another example, parameters used by the apparatus 10 or 10a may be calculated by method which is different from the one shown in FIG. 7.

As can be seen from the above-mentioned embodiments, the first neural network is used to estimate the nominal SOC, validity value of the nominal SOC is calculated and the SOC Kalman filter calculates the estimated SOC based on the nominal SOC and the validity value. Therefore, a systematic and efficient development methodology may be used to accurately estimate battery SOC.

In the present disclosure, a second neural network is used to estimate the validity of the nominal SOC based on operating zone. The KF gain is set to zero in operating zones where the nominal SOC is predicted to be invalid, and the KF gain is calculated according to the KF gain formulation otherwise.

The present disclosure provides a method for computing the parameters used for battery SOC estimation. The method employs commercially available neural-network optimization packages, which enable a high degree of accuracy in the neural networks, while comparatively few engineering resources are required.

The present disclosure is found to be especially helpful in providing accurate SOC estimation for applications (such as for LFP cell chemistries) in which the degree of
correlation between SOC and available measurements varies substantially from one operating zone to another.

Second Aspect of Embodiments

A method for battery state of charge (SOC) estimation is provided in the second aspect of embodiments. The method is corresponding to the apparatus for battery state of charge (SOC) estimation provided in the first aspect of embodiments. Same contents as those in the first aspect of embodiments are omitted.

Figure 8:
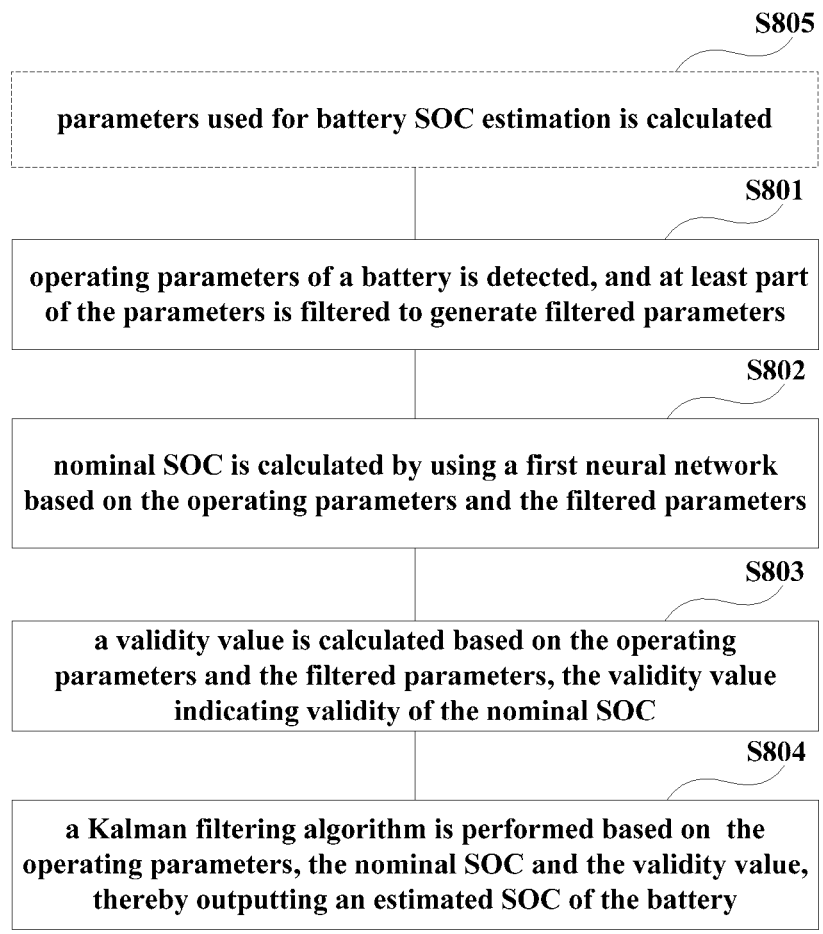
FIG. 8 is a flowchart of a method for battery state of charge estimation according to one embodiment.

FIG. 8 is a flowchart of a method for battery state of charge estimation according to one embodiment.

As shown in FIG. 8, the method includes:

S801, operating parameters of a battery is detected, and at least part of the parameters is filtered to generate filtered parameters;

S802, nominal SOC is calculated by using a first neural network based on the operating parameters and the filtered parameters;

S803, a validity value is calculated based on the operating parameters and the filtered parameters, the validity value indicating validity of the nominal SOC; and S804, a Kalman filtering algorithm is performed based on the operating parameters, the nominal SOC and the validity value, thereby outputting an estimated SOC of the battery.

Details of each block may be referred to the corresponding description in the first aspect of embodiments.

As shown in FIG. 8, the method may further include:

S805, parameters used for battery SOC estimation is calculated.

Details of block S805 may be referred to the flow chart of FIG. 7 in the first aspect of embodiments.

As can be seen from the above-mentioned embodiments, the first neural network is used to estimate the nominal SOC, the second neural network is used to estimate the validity value of the nominal SOC and the SOC Kalman filter calculates the estimated SOC based on the nominal SOC and the validity value. Besides, the parameters are computed using a well-defined, optimization-based workflow. Therefore, a systematic and efficient development methodology may be used to accurately estimate battery SOC.

Third Aspect of the Embodiments

The third aspect of the embodiments of this disclosure provides an electronic equipment including the apparatus 10, 10a or parameter calculator 600 described in the first aspect of the embodiments.

Figure 9:
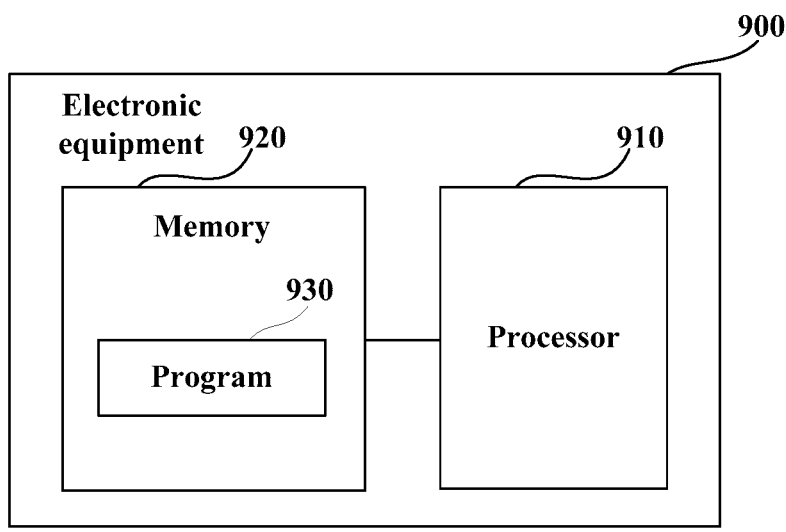
FIG. 9 is a schematic diagram of a structure of the electronic equipment of the embodiment of this disclosure.

FIG. 9 is a schematic diagram of a structure of the electronic equipment of the embodiment of this disclosure. As shown in FIG. 9, an electronic equipment 900 may include a processor 910 and a memory 920, the memory 920 being coupled to the processor 910. The memory 920 may store various data, and furthermore, it may store a program 930 for data processing, and execute the program 930 under control of the processor 910.

In one implementation, the functions of the apparatus 10, 10a or parameter calculator 600 may be integrated into the processor 910. The processor 910 may be configured to be able to carry out the method in the second aspect of the embodiments.

In another implementation, the apparatus 10, 10a or parameter calculator 600 and the processor 910 may be configured separately; for example, the apparatus 10, 10a or parameter calculator 600 may be configured as a chip connected to the processor 910, and the functions of the apparatus 10 or parameter calculator 600 are executed under control of the processor 910.

Embodiments of this disclosure may further provide a computer readable program, which, when executed in an apparatus or an electronic equipment, causes the apparatus or the electronic equipment to carry out the method as described in the second aspect of the embodiments of this disclosure.

Embodiments of this disclosure may further provide a computer storage medium, including a computer readable program, which causes an apparatus or an electronic equipment to carry out the method as described in the second aspect of the embodiments of this disclosure.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A battery management system (BMS), comprising:
a memory; and
a processor, coupled to the memory, configured to:
couple a current detection unit to a battery to detect a current, couple a voltage detection unit to the battery to detect a voltage, or couple a temperature detection unit to the battery to detect a temperature;
receive operating parameters of the battery from the current detection unit, the voltage detection unit, or the temperature detection unit;
filter and output at least part of the parameters to generate filtered parameters;
calculate and output a nominal SOC by using a first neural network based on the operating parameters and the filtered parameters transmitted;
estimate and output a validity value based on the operating parameters and the filtered parameters, the validity value indicating validity of the nominal SOC; and
perform a Kalman filtering algorithm based on the operating parameters, the nominal SOC, and the validity value, thereby outputting an estimated SOC of the battery,
wherein the BMS uses the estimated SOC to indicate when the battery needs to be recharged to prolong a life of the battery
wherein the operating parameters comprises current, voltage, and temperature, wherein the filtered parameters comprises filtered current and filtered voltage, wherein the processor is configured to:
transmit the current to the SOC Kalman filter;
filter the current by using a time constant of T seconds and output the filtered current; and
filter the voltage by using the time constant of T seconds and output the filtered voltage,
calculate a gain value based on the validity value, a parameter Q, and a parameter R, where the parameter Q is a covariance associated with a rate of increase in an SOC covariance if SOC is not otherwise corrected, the parameter R is a covariance associated with an error between the nominal SOC and a true SOC when the validity value indicates the nominal SOC is valid; and
calculate the estimated SOC based on the nominal SOC, the current, a parameter B, and the gain value, where the parameter B is determined according to a Kalman filtering algorithm calculation cycle time (Ts) and a rated capacity (C) of the battery.

2. The BMS according to claim 1, wherein the processor is configured to:
estimate a squared nominal SOC error by using a second neural network based on the operating parameters and the filtered parameters, in which the squared nominal SOC error indicates square of the difference between the true SOC and the nominal SOC; and
output the validity value based on a magnitude of the squared nominal SOC error, an elapsed execution time since a current low-pass filter initialization, and/or a voltage low-pass filter initialization.

3. The BMS according to claim 2, wherein,
when the magnitude of the squared nominal SOC error is below a first predetermined value ($E^2$) and the elapsed execution time since the current low-pass filter initialization and/or the voltage low-pass filter initialization is greater than a second predetermined value (3T), the validity value indicates the nominal SOC is valid.

4. The BMS according to claim 3, wherein the processor is configured to:
determine the squared nominal SOC error is below the first predetermined value and in response output a first determination result;
determine the elapsed execution time since the current low-pass filter initialization and/or the voltage low-pass filter initialization is greater than the second predetermined value and in response output a second determination result; and
output the validity value according to the first determination result and the second determination result.

5. The BMS according to claim 1, wherein the processor is further configured to:
compute a nominal SOC based on experimental data;
compute a squared nominal SOC error based on the experimental data;
identify-a subset of data from data set for which the squared nominal SOC error is less than a first predetermined value; and
calculate the variance of the difference between true SOC and nominal SOC for the identified subset of data, wherein the calculating result is parameter R used in the Kalman filtering algorithm.

6. The BMS according to claim 5, wherein the processor is further configured to:
calculate the true SOC using a coulomb counting method based on the experimental data;
train a first neural network, with an objective of minimizing a root mean squared error between the true SOC and the nominal SOC computed by the first neural network under training;
compute a squared SOC prediction error as a square of a difference between the true SOC and the nominal SOC computed by the trained first neural network; and
train a second neural network, with an objective of minimizing root mean squared error between the squared SOC prediction error and the squared nominal SOC error computed by the second neural network under training.

7. A method for battery management, comprising:
coupling a current detection unit to a battery to detect a current, coupling a voltage detection unit to the battery to detect a voltage, or coupling a temperature detection unit to the battery to detect a temperature;
receiving operating parameters of the battery from the current detection unit, the voltage detection unit, or the temperature detection unit;

filtering at least part of the parameters to generate filtered parameters;
calculating a nominal SOC by using a first neural network based on the operating parameters and the filtered parameters;
calculating a validity value based on the operating parameters and the filtered parameters, the validity value indicating validity of the nominal SOC; and
performing a Kalman filtering algorithm by an SOC Kalman filter based on the operating parameters, the nominal SOC, and the validity value, thereby outputting an estimated SOC of the battery,
wherein the estimated SOC being used to indicate when the battery needs to be recharged to prolong a life of the battery,
wherein the detected operating parameters comprises current, voltage, and temperature, the filtered parameters comprises filtered current and filtered voltage, and the operating parameters used for performing the Kalman filtering algorithm comprises current,
wherein the filtered current is generated by filtering the current by a current low-pass filter with a time constant of T seconds and the filtered voltage is generated by filtering the voltage by a voltage low-pass filter with the time constant of T seconds,
wherein the estimated SOC is calculated by the following steps:
calculating a gain value based on the validity value, parameter Q, and parameter R, where the parameter Q is a covariance associated with a rate of increase in an SOC covariance if SOC is not otherwise corrected, the parameter R is a covariance associated with an error between the nominal SOC and a true SOC when the validity value indicates the nominal SOC is valid; and
calculating the estimated SOC based on the nominal SOC, the current, the parameter B and the gain value, where the parameter B is the determined according to an SOC Kalman filter calculation cycle time (Ts) and a rated capacity (C) of the battery.

8. The method for battery management according to claim 7, wherein calculating the validity value comprises:
estimating a squared nominal SOC error by using a second neural network based on the operating parameters and the filtered parameters, the squared nominal SOC error indicating a square of a difference between the true SOC and the nominal SOC; and
outputting the validity value based on a magnitude of the squared nominal SOC error and an elapsed execution time since a current low-pass filter initialization and/or a voltage low-pass filter initialization.

9. The method for battery management according to claim 8, wherein,
when the magnitude of the squared nominal SOC error is below a first predetermined value ($E^2$) and the elapsed execution time since the current low-pass filter initialization and/or the voltage filter initialization is greater than a second predetermined value (3T), the validity value indicates the nominal SOC is valid.

10. The method for battery management according to claim 9, wherein the validity value is determined by the following steps:
determining whether the squared nominal SOC error is below the first predetermined value;
determining whether the elapsed execution time since the current low-pass filter initialization and/or the voltage filter initialization is greater than the second predetermined value; and
outputting the validity value according to the determination result of the squared nominal SOC error and the determination result of the elapsed execution time since the current low-pass filter initialization and/or the voltage filter initialization.

11. The method for battery management according to claim 7, comprising:
computing a nominal SOC based on experimental data;
computing a squared nominal SOC error based on the experimental data;
identifying a subset of data from a data set for which the squared nominal SOC error is less than a first predetermined value; and
calculating a variance of the difference between true SOC and nominal SOC for the identified subset of data,
wherein the calculating result is parameter R used in the Kalman filtering algorithm.

12. The method for battery management according to claim 7, comprising:
calculating the true SOC using a coulomb counting method based on experimental data;
training the first neural network, with an objective of minimizing a root mean squared error between the true SOC and the nominal SOC computed by the first neural network under training;
computing a squared SOC prediction error as a square of the difference between the true SOC and the nominal SOC computed by the trained first neural network; and
training a second neural network, with an objective of minimizing a root mean squared error between the squared SOC prediction error and a squared nominal SOC error computed by the second neural network under training.

13. A non-transitory computer readable storage medium, storing a plurality of programs for execution by an apparatus having one or more processors, wherein the plurality of programs, when executed by the one or more processors, cause the apparatus to perform battery management, comprising:
coupling a current detection unit to a battery to detect a current, coupling a voltage detection unit to the battery to detect a voltage, or coupling a temperature detection unit to the battery to detect a temperature;
receiving operating parameters of the battery from the current detection unit, the voltage detection unit, or the temperature detection unit;
filtering at least part of the parameters to generate filtered parameters;
calculating a nominal SOC by using a first neural network based on the operating parameters and the filtered parameters;
calculating a validity value based on the operating parameters and the filtered parameters, the validity value indicating validity of the nominal SOC; and
performing a Kalman filtering algorithm by an SOC Kalman filter based on the operating parameters, the nominal SOC, and the validity value, thereby outputting an estimated SOC of the battery,
wherein the estimated SOC being used to when the battery needs to be recharged to prolong a life of the battery
wherein the detected operating parameters comprises current, voltage, and temperature, the filtered parameters comprises filtered current and filtered voltage, and the operating parameters used for performing the Kalman filtering algorithm comprises current, wherein the filtered current is generated by filtering the current by a current low-pass filter with a time constant of T seconds and the filtered voltage is generated by filtering the voltage by a voltage low-pass filter with the time constant of T seconds, wherein the estimated SOC is calculated by the following steps:
- calculating a gain value based on the validity value, parameter Q, and parameter R, where the parameter Q is a covariance associated with a rate of increase in an SOC covariance if SOC is not otherwise corrected, the parameter R is a covariance associated with an error between the nominal SOC and a true SOC when the validity value indicates the nominal SOC is valid; and
- calculating the estimated SOC based on the nominal SOC, the current, the parameter B and the gain value, where the parameter B is the determined according to an SOC Kalman filter calculation cycle time (Ts) and a rated capacity (C) of the battery.

* * * * *